United States Patent
Zhang et al.

(10) Patent No.: US 10,136,463 B2
(45) Date of Patent: Nov. 20, 2018

(54) SERVER AND DATA TRANSMISSION METHOD

(71) Applicant: Yulong Computer Telecommunication Scientific (Shenzhen) Co., Ltd., Shenzhen, Guangdong (CN)

(72) Inventors: Chenlu Zhang, Guangdong (CN); Kewen Yang, Guangdong (CN)

(73) Assignee: Nanchag Coolpad Intelligent Technology Company Limited, Nanchang, Jiangxi (CN)

(*) Notice: Subject to any disclaimer, the term of this patent is extended or adjusted under 35 U.S.C. 154(b) by 112 days.

(21) Appl. No.: 15/370,698

(22) Filed: Dec. 6, 2016

(65) Prior Publication Data

US 2017/0086240 A1   Mar. 23, 2017

Related U.S. Application Data

(63) Continuation-in-part of application No. PCT/CN2014/087836, filed on Sep. 29, 2014.

(30) Foreign Application Priority Data

Jun. 9, 2014 (CN) .......................... 2014 1 0253388

(51) Int. Cl.
*H04L 29/08* (2006.01)
*H04L 12/24* (2006.01)
(Continued)

(52) U.S. Cl.
CPC ............ *H04W 76/14* (2018.02); *H04L 41/12* (2013.01); *H04L 67/16* (2013.01);
(Continued)

(58) Field of Classification Search
CPC ..... H04W 76/10; H04W 76/14; H04W 76/02; H04W 72/0406; H04W 76/023; H04W 88/06; H04L 67/16; H04L 41/12
See application file for complete search history.

(56) References Cited

U.S. PATENT DOCUMENTS

| 2009/0157829 A1* | 6/2009 | Choi | G06Q 10/107 |
| | | | 709/206 |
| 2012/0057579 A1* | 3/2012 | Kim | H04W 4/00 |
| | | | 370/338 |

(Continued)

FOREIGN PATENT DOCUMENTS

| CN | 101772199 A | 7/2010 |
| CN | 102547590 A | 7/2012 |

(Continued)

OTHER PUBLICATIONS

Extended European Search Report dated Jan. 2, 2018 from corresponding European Patent Application No. 14894370.7.

*Primary Examiner* — Brian D Nguyen
(74) *Attorney, Agent, or Firm* — Young Basile Hanlon & MacFarlane, P.C.

(57) ABSTRACT

A server is provided, which includes a terminal determining unit which determines a destination terminal to share a service when a service request sent by any terminal is received or when it is detected that a network-side needs to share the service, a generation unit which generates service network topology structure information corresponding to the service according to the destination terminal, and a network determining unit which determines a hosted network corresponding to the service according to the service network topology structure information. Correspondingly, a data transmission method is also provided.

18 Claims, 13 Drawing Sheets

(51) Int. Cl.
*H04W 72/04* (2009.01)
*H04W 76/14* (2018.01)
*H04W 76/10* (2018.01)
*H04W 88/06* (2009.01)

(52) U.S. Cl.
CPC ....... *H04W 72/0406* (2013.01); *H04W 76/10* (2018.02); *H04W 88/06* (2013.01)

(56) References Cited

U.S. PATENT DOCUMENTS

| | | | |
|---|---|---|---|
| 2013/0005377 A1 | 1/2013 | Wang et al. | |
| 2013/0304877 A1* | 11/2013 | Um | H04L 41/082 709/220 |
| 2014/0258412 A1* | 9/2014 | Li | H04L 67/34 709/204 |
| 2015/0195313 A1* | 7/2015 | Lewis | G06Q 50/01 709/204 |
| 2015/0223284 A1* | 8/2015 | Jain | H04W 4/70 370/329 |
| 2015/0365457 A1* | 12/2015 | Dvir | H04L 65/608 709/219 |

FOREIGN PATENT DOCUMENTS

| | | |
|---|---|---|
| CN | 103249007 A | 8/2013 |
| CN | 103270792 A | 8/2013 |
| CN | 103582157 A | 2/2014 |
| CN | 103686825 A | 3/2014 |
| CN | 104009998 A | 8/2014 |
| CN | 104010300 A | 8/2014 |
| CN | 104010385 A | 8/2014 |
| WO | WO2007085592 A | 8/2007 |
| WO | 2013052163 A1 | 4/2013 |
| WO | WO2013102253 A | 7/2013 |

* cited by examiner

SERVER AND DATA TRANSMISSION METHOD

CROSS-REFERENCE TO RELATED APPLICATION(S)

This application is a continuation-in-part of International Application No. PCT/CN2014/087836, filed on Sep. 29, 2014, which claims priority to Chinese Patent Application No. 201410253388.6, filed on Jun. 9, 2014, the disclosures of both of which are incorporated by references in their entireties.

TECHNICAL FIELD

The present disclosure relates to communication technology field, and particularly to a server and a data transmission method.

BACKGROUND

The introduction of device to device (D2D) technology provides technology support for increasing efficiency of use of frequency spectrum, increasing system throughput, reducing consumption of user equipment, and reducing operating cost of operators. The present 3GPP network has already studied the D2D technology, and defines multiple application scenarios of the D2D technology. In the study of the present D2D technology of the network-side, the main concern is the method of establishing a D2D network on the physical layer, for example, how to establish the D2D network between two user equipment.

SUMMARY

The present disclosure provides a server which includes a terminal determining unit which determines a destination terminal to share a service when a service request sent by any terminal is received or when it is detected that a network-side needs to share the service, a generation unit which generates service network topology structure information corresponding to the service according to the destination terminal, and a network determining unit which determines a hosted network corresponding to the service according to the service network topology structure information.

In the technical solution, the hosted network corresponding to the service can be determined according to the service network topology structure information generated according to the destination terminal, thus the trust and incentive problem in the D2D network can be resolved, security in data sharing can be increased, and cross-layer optimization between a physical domain network and a service domain network can be accomplished.

In the above technical solution, preferably, the service request includes a service sharing request and a normal service request.

In the technical solution, by dividing the service request into the service sharing request and the normal service request, the system can identify the type of the service request more conveniently, so as to take corresponding actions.

In the above technical solution, preferably, the terminal determining unit further includes a search unit which searches in databases to determine whether or not a D2D sharing network corresponding to the service exists or whether or not other users launch the same service request or whether or not other users have the same service requirement according to the normal service request when the service request is received from any terminal and the service request is the normal service request, and a first determining unit which determines the destination terminal according to search results of the search unit.

In the technical solution, when the service request is the normal service request, that is, when a terminal requests a certain data service from the server, the server searches in the databases to determine whether or not a sharing network corresponding to the service exists or whether or not other users have the same service request according to the normal service request, so as to determine whether or not a network can be established to share data.

In the above technical solution, preferably, the databases include a database of the server and databases of other servers. The server can further include a first interaction unit which transmits the normal service request to the other servers, such that the other servers can search in the corresponding databases to determine whether or not a sharing network corresponding to the service exists or whether or not other users launch the same service request or whether or not other users have the same service requirement. The first interaction unit further receives search results from the other servers.

In the technical solution, not only the database of one server is searched to find the destination terminal, the normal service request can be transmitted to the other servers, and the other servers search in the corresponding databases to find the sharing network corresponding to the service or the same service request of other users, and return the search results to the server. Thus, by searching in the corresponding databases of multiple servers to find the destination terminal, the terminal which satisfies the sharing requirement can be found in a greater range, which expands the sharing range.

In the above technical solution, preferably, the terminal determining unit further includes a first transmission unit which determines multiple group terminals the interest group of which is the same as that of any terminal when the service request sent by the any terminal is received and the service request is the service sharing request, and transmits a service sharing notification to the multiple group terminals. The terminal determining unit further includes a second determining unit which determines the destination terminal according to service sharing feedback information transmitted by the multiple group terminals.

In the technical solution, the service sharing notification can be transmitted to the multiple group terminals which are in the same interest group, and the service sharing feedback information is received from the group terminals. The terminal which agrees sharing is determined as the destination terminal according to the service sharing feedback information. Therefore, security and reliability of data sharing can be increased, the trust problem in the D2D network can be fully considered, and meanwhile data sharing between interest groups can be accomplished. Wherein, the interest group can be an interest group formed according to upper application or subscription data, such as a group in Wechat, QQ, or like.

In the above technical solution, preferably, the terminal determining unit further includes a second transmission unit which transmits the service sharing notification to multiple terminals when a service request from any terminal is received and the service request is the service sharing request, wherein the service sharing request includes service description information and access limitation information. The terminal determining unit further includes a third determining unit which determines the destination terminal according to the service sharing feedback information transmitted by the multiple terminals, wherein the service sharing feedback information includes position information of the terminal.

In the technical solution, when any terminal wants to share a certain data service, the any terminal can transmit the service sharing notification to multiple terminals simultaneously, and embed its requirements such as the service description information and the access limitation information into the service sharing request. The third determining unit determines the destination terminal which satisfies the requirements of the service requester-side and determines the position information of the destination terminal, wherein, the service description information is used to describe data content to be shared, and the access limitation information is to describe a time range of opening the data sharing service (for example, N hours) and/or condition information of access limitation (for example, credit level>N, particular groups/users allowed to be accessed). By doing so, cross-layer optimization between the physical domain network and the service domain network is accomplished. Furthermore, by facing to more terminals, efficiency of data sharing and transmission can also be increased.

In the above technical solution, preferably, the terminal determining unit further includes a third transmission unit which transmits the service sharing notification to multiple terminals when it is detected that the network-side has a service requirement, wherein the service sharing notification includes service description information and service identifier information. The terminal determining unit further includes a fourth determining unit which determines the destination terminal according to the service sharing feedback information transmitted by the multiple terminals, wherein, the service sharing feedback information includes position information and ability information of the terminal.

In the technical solution, when the network-side has a service requirement, the service sharing notification can be transmitted to multiple terminals of the server and other servers. The terminal determines whether or not it is interested in the service sharing according to the service sharing notification, and accordingly returns the service sharing feedback information, and accordingly whether or not the sharing network can be established is determined according to the feedback information.

In the above technical solution, preferably, the multiple terminals belong to the server and other servers. The server further includes a second interaction unit which transmits the service sharing notification to the other servers, such that the other servers transmit the service sharing notification to the corresponding terminals, and the second interaction unit further receives the service sharing feedback information transmitted by the corresponding terminals of the other servers.

In the technical solution, all of the multiple terminals can be from a server that is the server, and can also be from multiple servers consisted of the server and the other servers. By doing so, by transmitting the data sharing notification to the terminals of the multiple servers, the sharing range is expanded.

In the above technical solution, preferably, the server can further include an identifier defining unit which defines a service sharing identifier for the D2D service, such that the service can be identified according to the service sharing identifier.

In the technical solution, by defining an identifier for the sharing service, the server can directly identify the sharing service according to the identifier and take corresponding solutions, such that determination of whether or not the service is the sharing service can be avoided, which saves power consumption of user equipment and also reduces operating cost of operators.

In the above technical solution, preferably, the service network topology structure information includes one of the following or a combination of the following: node position information, node attribute information, and node identifier information of the topology structure.

In the technical solution, the service network topology structure information formed by any one of or a combination of different node position information, node attribute information, and node identifier information has its uniqueness. The corresponding particular hosted network is determined according to the service network topology structure information, which contributes to the increase of security of data sharing. Wherein, the node position information, such as eNB id, GPS coordinates of the node, indicates the information of the region of the node. The node attribute indicates that the node belongs to a data reception node or/and a data source node. The node identifier indicates the identity of user equipment, such as IMSI, and so on.

In the above technical solution, preferably, the server further includes a network establishing unit which directly establishes the determined hosted network and transmits a networking notification to the destination terminal.

In the technical solution, the corresponding hosted network is determined according to the obtained service network topology structure information, and the destination terminal is informed to cause the destination terminal to know the condition of the current access network, which enhances security of network sharing, and solves the trust and incentive problem in the D2D network.

In the above technical solution, preferably, the server can further include a recommendation transmission unit which transmits a networking recommendation to the destination terminal after the hosted network corresponding to the service is determined, such that whether or not the hosted network is established is determined according to the networking feedback information of the destination terminal.

In the technical solution, after the hosted network is determined, the networking recommendation is transmitted to ask for permission of the destination terminal. The hosted network is established under the condition of that the destination terminal agrees, which greatly enhances security of the destination terminal.

In the above technical solution, preferably, the network determining unit further includes an acquisition unit which acquires a preset physical domain networking rule and a business mode domain networking rule, and determines the hosted network corresponding to the service according to the preset physical domain networking rule, the business mode domain networking rule, and the service network topology structure information.

In the technical solution, the D2D network is established according to the physical domain network, the business mode domain network, and the service domain network, which can accomplish cross-layer optimization of the physical domain network and the service domain network.

According to another aspect of the present disclosure, the present disclosure further provides a data transmission method which includes determining a destination terminal to share a service when a service request sent by any terminal is received or when it is detected that a network-side needs to share the service, generating service network topology structure information corresponding to the service according to the destination terminal, and determining a hosted network corresponding to the service according to the service network topology structure information.

In the technical solution, the hosted network corresponding to the service can be determined according to the service network topology structure information generated according to the destination terminal, thus the trust and incentive problem in D2D networks can be resolved, security in data sharing can be increased, and cross-layer optimization between a physical domain network and a service domain network can be accomplished.

In the above technical solution, preferably, the service request includes a service sharing request and a normal service request.

In the technical solution, by dividing the service request into the service sharing request and the normal service request, the system can identify the type of the service request more conveniently, so as to take corresponding actions.

In the technical solution, preferably, the determining the destination terminal to share the service particularly includes: searching, by the server, in databases to determine whether or not a D2D sharing network corresponding to the service exists or whether or not other users launch the same service request or whether or not other users have the same service requirement according to the normal service request when a service request is received from any terminal and the service request is the normal service request, and determining the destination terminal according to search results.

In the technical solution, when the service request is the normal service request, that is, when a terminal requests a certain data service from the server, the server searches in the databases to determine whether or not a sharing network corresponding to the service exists or whether or not other users have the same service request according to the normal service request, so as to determine whether or not a network can be established to share data.

In the above technical solution, preferably, the databases include a database of the server and databases of other servers. The data transmission method can further include transmitting the normal service request to the other servers, such that the other servers can search in the corresponding databases to determine whether or not a sharing network corresponding to the service exists or whether or not other users launch the same service request or whether or not other users have the same service requirement. The data transmission method further includes receiving the search results from the other servers.

In the technical solution, not only the database of one server is searched to find the destination terminal, the normal service request can be transmitted to the other servers, and the other servers search in the corresponding databases to find the sharing network corresponding to the service or the same service request of other users, and return the search results to the server. Thus, by searching in the corresponding databases of multiple servers to find the destination terminal, the terminal which satisfies the sharing requirement can be found in a greater range, which expands the sharing range.

In the above technical solution, preferably, the determining the destination terminal to share the service particularly includes: determining multiple group terminals the interest group of which is the same as that of any terminal when a service request sent by the any terminal is received and the service request is the service sharing request, and transmitting a service sharing notification to the multiple group terminals; and determining the destination terminal according to service sharing feedback information transmitted by the multiple group terminals.

In the technical solution, the service sharing notification can be transmitted to the multiple group terminals which are in the same interest group, and the service sharing feedback information is received from the group terminals. The terminal which agrees sharing is determined as the destination terminal according to the service sharing feedback information. Therefore, security and reliability of data sharing can be increased, the trust problem in the D2D network can be fully considered, and meanwhile data sharing between interest groups can be accomplished. Wherein, the interest group can be an interest group formed according to upper application or subscription data, such as a group in Wechat, QQ, or like.

In the above technical solution, preferably, the determining the destination terminal to share the service particularly includes: transmitting the service sharing notification to multiple terminals when a service request from any terminal is received and the service request is the service sharing request, wherein the service sharing request includes service description information and access limitation information. The determining a destination terminal to share a service further includes determining the destination terminal according to the service sharing feedback information transmitted by the multiple terminals, wherein, the service sharing feedback information includes position information of the terminal.

In the technical solution, when any terminal wants to share a certain data service, the any terminal can transmit the service sharing notification to multiple terminals simultaneously, and embed its requirements such as the service description information and the access limitation information into the service sharing request. The third determining unit determines the destination terminal which satisfies the requirements of the service requester-side and determines the position information of the destination terminal, wherein, the service description information is used to describe data content to be shared, and the access limitation information is to describe a time range of opening the data sharing service (for example, N hours) and/or condition information of access limitation (for example, credit level>N, particular groups/users allowed to be accessed). By doing so, cross-layer optimization between the physical domain network and the service domain network is accomplished. Furthermore, by facing to more terminals, efficiency of data sharing and transmission can also be increased.

In the above technical solution, preferably, the determining the destination terminal to share the service particularly includes: transmitting the service sharing notification to multiple terminals when it is detected that the network-side has a service requirement, wherein the service sharing notification includes service description information and service identifier information. The determining a destination terminal to share a service further includes determining the destination terminal according to the service sharing feedback information transmitted by the multiple terminals, wherein, the service sharing feedback information includes position information and ability information of the terminal.

In the technical solution, when the network-side has a service requirement, the service sharing notification can be transmitted to multiple terminals of the server and other servers. The terminal determines whether or not it is interested in the service sharing according to the service sharing notification, and accordingly returns the service sharing feedback information, and accordingly whether or not the sharing network can be established is determined according to the feedback information.

In the above technical solution, preferably, the multiple terminals belong to the server and other servers. The data transmission method further includes transmitting the service sharing notification to the other servers, such that the other servers transmit the service sharing notification to the corresponding terminals. The data transmission method further includes receiving the service sharing feedback information transmitted by the corresponding terminals of the other servers.

In the technical solution, all of the multiple terminals can be from a server that is the server, and can also be from multiple servers consisted of the server and the other servers. By doing so, by transmitting the data sharing notification to the terminals of the multiple servers, the sharing range is expanded.

In the above technical solution, preferably, the data transmission method can further include defining a service sharing identifier for the D2D service, such that the service can be identified according to the service sharing identifier.

In the technical solution, by defining an identifier for the sharing service, the server can directly identify the sharing service according to the identifier and take corresponding solutions, such that determination of whether or not the service is the sharing service can be avoided, which saves power consumption of user equipment and also reduces operating cost of operators.

In the above technical solution, preferably, the service network topology structure information includes one of the following or a combination of the following: node position information, node attribute information, and node identifier information of the topology structure.

In the technical solution, the service network topology structure information formed by any one of or a combination of different node position information, node attribute information, and node identifier information has its uniqueness. The corresponding particular hosted network is determined according to the service network topology structure information, which contributes to the increase of security of data sharing. Wherein, the node position information, such as eNB id, GPS coordinates of the node, indicates the information of the region of the node. The node attribute indicates that the node belongs to a data reception node or/and a data source node. The node identifier indicates the identity of user equipment, such as IMSI, and so on.

In the above technical solution, preferably, the data transmission method further includes establishing the determined hosted network directly and transmitting a networking notification to the destination terminal.

In the technical solution, the corresponding hosted network is determined according to the obtained service network topology structure information, and the destination terminal is informed to cause the destination terminal to know the condition of the current access network, which enhances security of network sharing, and solves the trust and incentive problem in the D2D network.

In the above technical solution, preferably, the data transmission method can further include transmitting a networking recommendation to the destination terminal after the hosted network corresponding to the service is determined, such that whether or not the hosted network is established is determined according to the networking feedback information of the destination terminal.

In the technical solution, after the hosted network is determined, the networking recommendation is transmitted to ask for permission of the destination terminal. The hosted network is established under the condition of that the destination terminal agrees, which greatly enhances security of the destination terminal.

In the above technical solution, preferably, the data transmission method further includes: acquiring a preset physical domain networking rule and a business mode domain networking rule, and determining the hosted network corresponding to the service according to the preset physical domain networking rule, the business mode domain networking rule, and the service network topology structure information.

Through the above technical solution, the trust and incentive problem in a D2D network can be solved, security of data sharing can be increased, and cross-layer optimization of a physical domain network and a service domain network can be accomplished.

DETAILED DESCRIPTION

Figure 1:
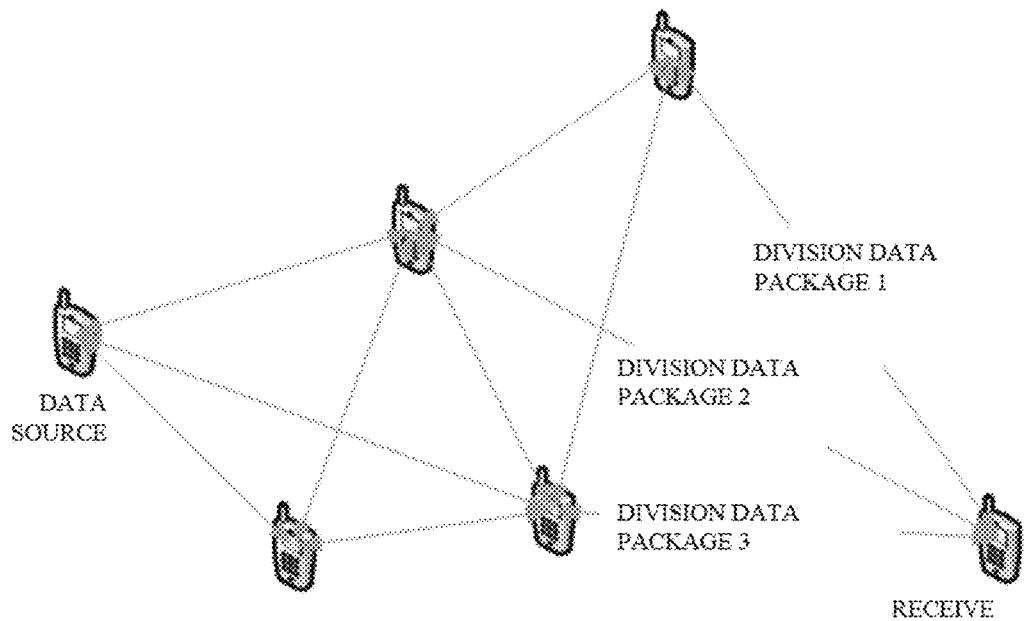
FIG. 1 shows an assumed application scenario of device to device (D2D) of the present technology.

The study of the D2D technology in academia provides a future application scenario of the D2D technology (as shown in FIG. 1): combining the D2D technology and P2P to realize D2D LAN data sharing. To a great extent, the scenario can increase efficiency of data sharing and data transmission and reduce the load of the network-side.

However, in the present standardization process of the 3GPP, the main concern is how to establish the D2D between two user equipment, which depends on an assumption of that two user equipment which satisfy the physical establishment condition of the D2D (e.g., the distance is short enough) can realize the D2D, and the authorization and incentive problem of user equipment is not considered. Not only whether or not the user equipment in the D2D is safe and is trustworthy to transmit data is not considered, but also the potential business mode problem (incentive problem) during data transmission is not considered. There is no real business mode which can provide realization and support.

Therefore, what is needed is a new technology to solve the trust and incentive problem in the D2D network, increase security of data sharing, and accomplish cross-layer optimization between a physical domain network and a service domain network. Based on the above problems, a new technical solution is provided, which can solve the trust and incentive problem in a D2D network, increase security of data sharing, and accomplish cross-layer optimization of a physical domain network and a service domain network.

To understand the above-mentioned purposes, features and advantages of the present disclosure more clearly, the present disclosure will be further described in detail below in combination with the accompanying drawings and the specific implementations. It should be noted that, the implementations of the present application and the features in the implementations may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific implementations disclosed below.

Figure 2:
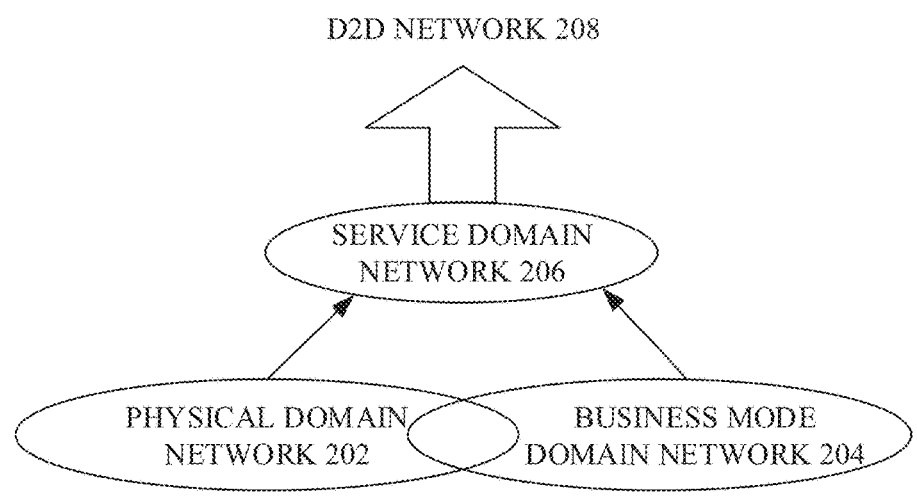
FIG. 2 shows a model of a D2D network in accordance with an exemplary implementation of the present disclosure.

FIG. 2 shows a model of a D2D network in accordance with an implementation of the present disclosure.

As shown in FIG. 2, a D2D network in accordance with an exemplary implementation of the present disclosure that is a D2D network 208 is consisted of a physical domain network 202, a business mode domain network 204, and a service domain network 206. Said three network domains describe a D2D network establishment manner from physical connection, business modes, and upper application structures, respectively. Wherein, the physical domain network 202 establishes a bottom layer D2D network which satisfies certain error rate and time-delay requirements according to physical characteristics of D2D nodes. The business mode domain network 204 controls access of the physical domain network 202 and selects nodes for the physical domain network 202 according to defined business mode domain limitation characteristics, e.g., credit and reciprocal principles, so as to form a hosted network which satisfies a certain business mode. The service domain network 206 establishes a logic connection network between a data source node and a reception destination node according to existed service relationships.

Figure 3:
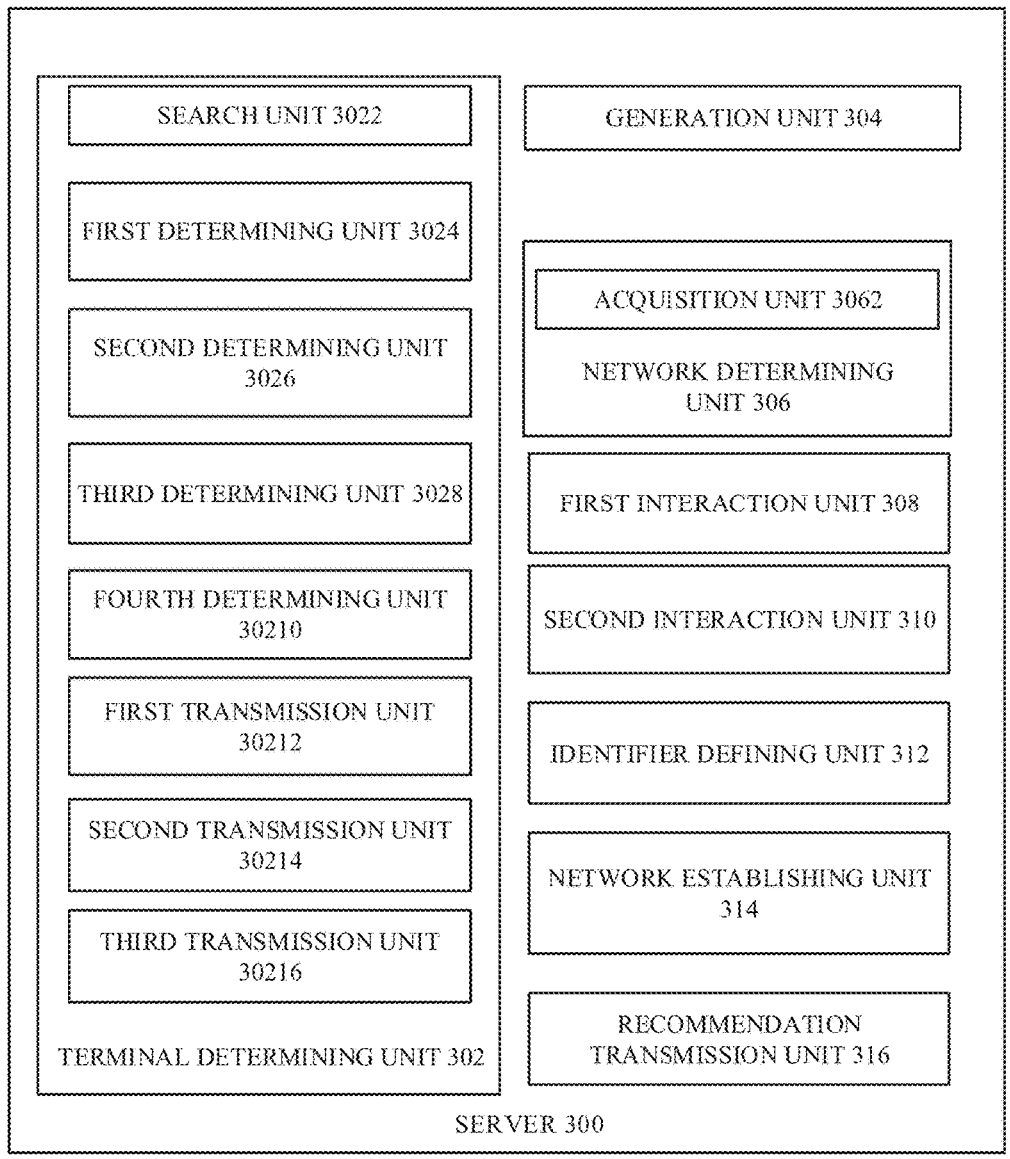
FIG. 3 shows a system block diagram of a server in accordance with an exemplary implementation of the present disclosure.

FIG. 3 shows a system block diagram of a server in accordance with an exemplary implementation of the present disclosure.

As shown in FIG. 3, a server 300 in accordance with an exemplary implementation of the present disclosure includes a terminal determining unit 302 which determines a destination terminal to share a service when a service request sent by any terminal is received or when it is detected that a network-side needs to share the service, a generation unit 304 which generates service network topology structure information corresponding to the service according to the destination terminal, and a network determining unit 306 which determines a hosted network corresponding to the service according to the service network topology structure information.

In the technical solution, the hosted network corresponding to the service can be determined according to the service network topology structure information generated according to the destination terminal, thus the trust and incentive problem in the D2D network can be resolved, security in data sharing can be increased, and cross-layer optimization between a physical domain network and a service domain network can be accomplished.

In the above technical solution, preferably, the service request includes a service sharing request and a normal service request.

In the technical solution, by dividing the service request into the service sharing request and the normal service request, the system can identify the type of the service request more conveniently, so as to take corresponding actions.

In the above technical solution, preferably, the terminal determining unit 302 further includes a search unit 3022 which searches in databases to determine whether or not a D2D sharing network corresponding to the service exists or whether or not other users launch the same service request or whether or not other users have the same service requirement according to the normal service request when the service request is received from any terminal and the service request is the normal service request, and a first determining unit 3024 which determines the destination terminal according to search results of the search unit 3022.

In the technical solution, when the service request is the normal service request, that is, when a terminal requests a certain data service from the server, the server searches in the databases to determine whether or not a sharing network corresponding to the service exists or whether or not other users have the same service request according to the normal service request, so as to determine whether or not a network can be established to share data.

In the above technical solution, preferably, the databases include a database of the server and databases of other servers. The server can further include a first interaction unit 308 which transmits the normal service request to the other servers, such that the other servers can search in the corresponding databases to determine whether or not a sharing network corresponding to the service exists or whether or not other users launch the same service request or whether or not other users have the same service requirement. The first interaction unit 308 further receives search results from the other servers.

In the technical solution, not only the database of one server is searched to find the destination terminal, the normal service request can be transmitted to the other servers, and the other servers search in the corresponding databases to find the sharing network corresponding to the service or the same service request of other users, and return the search results to the server. Thus, by searching in the corresponding databases of multiple servers to find the destination terminal, the terminal which satisfies the sharing requirement can be found in a greater range, which expands the sharing range.

In the above technical solution, preferably, the terminal determining unit 302 further includes a first transmission unit 30212 which determines multiple group terminals the interest group of which is the same as that of any terminal when the service request sent by the any terminal is received and the service request is the service sharing request, and transmits a service sharing notification to the multiple group terminals. The terminal determining unit 302 further includes a second determining unit 3026 which determines the destination terminal according to service sharing feedback information transmitted by the multiple group terminals.

In the technical solution, the service sharing notification can be transmitted to the multiple group terminals which are in the same interest group, and the service sharing feedback information is received from the group terminals. The terminal which agrees sharing is determined as the destination terminal according to the service sharing feedback information. Therefore, security and reliability of data sharing can be increased, the trust problem in the D2D network can be fully considered, and meanwhile data sharing between interest groups can be accomplished. Wherein, the interest group can be an interest group formed according to upper application or subscription data, such as a group in Wechat, QQ, or like.

In the above technical solution, preferably, the terminal determining unit 302 further includes a second transmission unit 30214 which transmits the service sharing notification to multiple terminals when a service request from any terminal is received and the service request is the service sharing request, wherein the service sharing request includes service description information and access limitation information. The terminal determining unit 302 further includes a third determining unit 3028 which determines the destination terminal according to the service sharing feedback information transmitted by the multiple terminals, wherein the service sharing feedback information includes position information of the terminal.

In the technical solution, when any terminal wants to share a certain data service, the any terminal can transmit the service sharing notification to multiple terminals simultaneously, and embed its requirements such as the service description information and the access limitation information into the service sharing request. The third determining unit 3028 determines the destination terminal which satisfies the requirements of the service requester-side and determines the position information of the destination terminal, wherein, the service description information is used to describe data content to be shared, and the access limitation information is to describe a time range of opening the data sharing service (for example, N hours) and/or condition information of access limitation (for example, credit level>N, particular groups/users allowed to be accessed). By doing so, cross-layer optimization between the physical domain network and the service domain network is accomplished. Furthermore, by facing to more terminals, efficiency of data sharing and transmission can also be increased.

In the above technical solution, preferably, the terminal determining unit 302 further includes a third transmission unit 30216 which transmits the service sharing notification to multiple terminals when it is detected that the network-side has a service requirement, wherein the service sharing notification includes service description information and service identifier information. The terminal determining unit 302 further includes a fourth determining unit 30210 which determines the destination terminal according to the service sharing feedback information transmitted by the multiple terminals, wherein, the service sharing feedback information includes position information and ability information of the terminal.

In the technical solution, when the network-side has a service requirement, the service sharing notification can be transmitted to multiple terminals of the server and other servers. The terminal determines whether or not it is interested in the service sharing according to the service sharing notification, and accordingly returns the service sharing feedback information, and accordingly whether or not the sharing network can be established is determined according to the feedback information.

In the above technical solution, preferably, the multiple terminals belong to the server and other servers. The server further includes a second interaction unit 310 which transmits the service sharing notification to the other servers, such that the other servers transmit the service sharing notification to the corresponding terminals, and the second interaction unit 310 further receives the service sharing feedback information transmitted by the corresponding terminals of the other servers.

In the technical solution, all of the multiple terminals can be from a server that is the server, and can also be from multiple servers consisted of the server and the other servers. By doing so, by transmitting the data sharing notification to the terminals of the multiple servers, the sharing range is expanded.

In the above technical solution, preferably, the server can further include an identifier defining unit 312 which defines a service sharing identifier for the D2D service, such that the service can be identified according to the service sharing identifier.

In the technical solution, by defining an identifier for the sharing service, the server can directly identify the sharing service according to the identifier and take corresponding solutions, such that determination of whether or not the service is the sharing service can be avoided, which saves power consumption of user equipment and also reduces operating cost of operators.

In the above technical solution, preferably, the service network topology structure information includes one of the following or a combination of the following: node position information, node attribute information, and node identifier information of the topology structure.

In the technical solution, the service network topology structure information formed by any one of or a combination of different node position information, node attribute information, and node identifier information has its uniqueness. The corresponding particular hosted network is determined according to the service network topology structure information, which contributes to the increase of security of data sharing. Wherein, the node position information, such as eNB id, GPS coordinates of the node, indicates the information of the region of the node. The node attribute indicates that the node belongs to a data reception node or/and a data source node. The node identifier indicates the identity of user equipment, such as IMSI, and so on.

In the above technical solution, preferably, the server further includes a network establishing unit 314 which directly establishes the determined hosted network and transmits a networking notification to the destination terminal.

In the technical solution, the corresponding hosted network is determined according to the obtained service network topology structure information, and the destination terminal is informed to cause the destination terminal to know the condition of the current access network, which enhances security of network sharing, and solves the trust and incentive problem in the D2D network.

In the above technical solution, preferably, the server can further includes a recommendation transmission unit 316 which transmits a networking recommendation to the destination terminal after the hosted network corresponding to the service is determined, such that whether or not the hosted network is established is determined according to the networking feedback information of the destination terminal.

In the technical solution, after the hosted network is determined, the networking recommendation is transmitted to ask for permission of the destination terminal. The hosted network is established under the condition of that the destination terminal agrees, which greatly enhances security of the destination terminal.

In the above technical solution, preferably, the network determining unit further includes an acquisition unit 3062 which acquires a preset physical domain networking rule and a business mode domain networking rule, and determines the hosted network corresponding to the service according to the preset physical domain networking rule, the business mode domain networking rule, and the service network topology structure information.

In the technical solution, various units of the server may be realized by computer programs which stored in a memory of the server, and can be executed by one or more processors of the server to perform corresponding functions, or various units of the server may be integrated in one processor or distributed different processors of the server.

In the technical solution, the D2D network is established according to the physical domain network, the business mode domain network, and the service domain network, which can accomplish cross-layer optimization of the physical domain network and the service domain network.

Figure 4A:
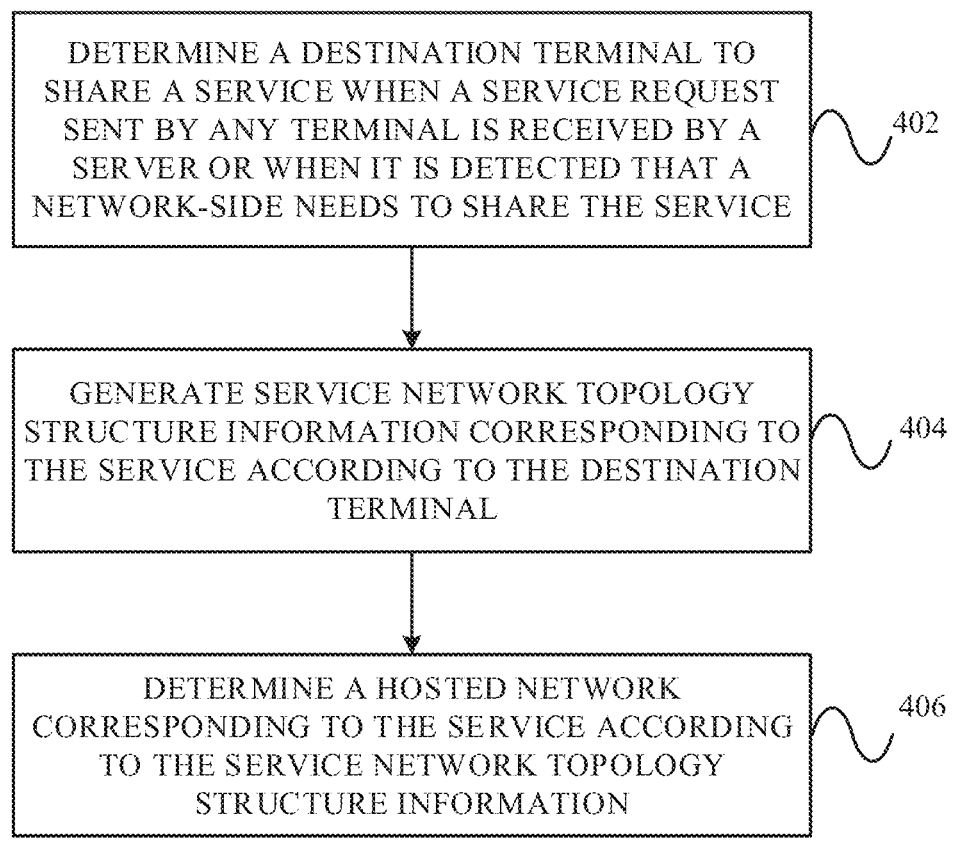
FIG. 4a shows a flow chart of a data transmission method in accordance with an exemplary implementation of the present disclosure.

FIG. 4a shows a flow chart of a data transmission method in accordance with an exemplary implementation of the present disclosure.

As shown in FIG. 4a, a data transmission method in accordance with an exemplary implementation of the present disclosure includes operation 402 of determining a destination terminal to share a service when a service request sent by any terminal is received or when it is detected that a network-side needs to share the service, operation 404 of generating service network topology structure information corresponding to the service according to the destination terminal, and operation 406 of determining a hosted network corresponding to the service according to the service network topology structure information.

In the technical solution, the hosted network corresponding to the service can be determined according to the service network topology structure information generated according to the destination terminal, thus the trust and incentive problem in D2D networks can be resolved, security in data sharing can be increased, and cross-layer optimization between a physical domain network and a service domain network can be accomplished.

In the above technical solution, preferably, the service request includes a service sharing request and a normal service request.

In the technical solution, by dividing the service request into the service sharing request and the normal service request, the system can identify the type of the service request more conveniently, so as to take corresponding actions.

In the technical solution, preferably, the determining a destination terminal to share a service particularly includes: searching, by the server, in databases to determine whether or not a D2D sharing network corresponding to the service exists or whether or not other users launch the same service request or whether or not other users have the same service requirement according to the normal service request when a service request is received from any terminal and the service request is the normal service request, and determining the destination terminal according to search results.

In the technical solution, when the service request is the normal service request, that is, when a terminal requests a certain data service from the server, the server searches in the databases to determine whether or not a sharing network corresponding to the service exists or whether or not other users have the same service request according to the normal service request, so as to determine whether or not a network can be established to share data.

In the above technical solution, preferably, the databases include a database of the server and databases of other servers. The data transmission method can further include transmitting the normal service request to the other servers, such that the other servers can search in the corresponding databases to determine whether or not a sharing network corresponding to the service exists or whether or not other users launch the same service request or whether or not other users have the same service requirement. The data transmission method further includes receiving the search results from the other servers.

In the technical solution, not only the database of one server is searched to find the destination terminal, the normal service request can be transmitted to the other servers, and the other servers search in the corresponding databases to find the sharing network corresponding to the service or the same service request of other users, and return the search results to the server. Thus, by searching in the corresponding databases of multiple servers to find the destination terminal, the terminal which satisfies the sharing requirement can be found in a greater range, which expands the sharing range.

In the above technical solution, preferably, the determining a destination terminal to share a service particularly includes: determining multiple group terminals the interest group of which is the same as that of any terminal when a service request sent by the any terminal is received and the service request is the service sharing request, and transmitting a service sharing notification to the multiple group terminals; and determining the destination terminal according to service sharing feedback information transmitted by the multiple group terminals.

In the technical solution, the service sharing notification can be transmitted to the multiple group terminals which are in the same interest group, and the service sharing feedback information is received from the group terminals. The terminal which agrees sharing is determined as the destination terminal according to the service sharing feedback information. Therefore, security and reliability of data sharing can be increased, the trust problem in the D2D network can be fully considered, and meanwhile data sharing between interest groups can be accomplished. Wherein, the interest group can be an interest group formed according to upper application or subscription data, such as a group in Wechat, QQ, or like.

In the above technical solution, preferably, the determining a destination terminal to share a service particularly includes: transmitting the service sharing notification to multiple terminals when a service request from any terminal is received and the service request is the service sharing request, wherein the service sharing request includes service description information and access limitation information. The determining a destination terminal to share a service further includes determining the destination terminal according to the service sharing feedback information transmitted by the multiple terminals, wherein, the service sharing feedback information includes position information of the terminal.

In the technical solution, when any terminal wants to a share certain data service, the any terminal can transmit the service sharing notification to multiple terminals simultaneously, and embed its requirements such as the service description information and the access limitation information into the service sharing request. The third determining unit 3028 determines the destination terminal which satisfies the requirements of the service requester-side and determines the position information of the destination terminal, wherein, the service description information is used to describe data content to be shared, and the access limitation information is to describe a time range of opening the data sharing service (for example, N hours) and/or condition information of access limitation (for example, credit level>N, particular groups/users allowed to be accessed). By doing so, cross-layer optimization between the physical domain network and the service domain network is accomplished. Furthermore, by facing to more terminals, efficiency of data sharing and transmission can also be increased.

In the above technical solution, preferably, the determining a destination terminal to share a service particularly includes: transmitting the service sharing notification to multiple terminals when it is detected that the network-side has service requirements, wherein the service sharing notification includes service description information and service identifier information. The determining a destination terminal to share a service further includes determining the destination terminal according to the service sharing feedback information transmitted by the multiple terminals, wherein, the service sharing feedback information includes position information and ability information of the terminal.

In the technical solution, when the network-side has service requirements, the service sharing notification can be transmitted to multiple terminals of the server and other servers. The terminal determines whether or not it is interested in the service sharing according to the service sharing notification, and accordingly returns the service sharing feedback information, and accordingly whether or not the sharing network can be established is determined according to the feedback information.

In the above technical solution, preferably, the multiple terminals belong to the server and other servers. The data transmission method further includes transmitting the service sharing notification to the other servers, such that the other servers transmit the service sharing notification to the corresponding terminals, and receiving the service sharing feedback information transmitted by the corresponding terminals of the other servers.

In the technical solution, all of the multiple terminals can be from a server that is the server, and can also be from multiple servers consisted of the server and the other servers. By doing so, by transmitting the data sharing notification to the terminals of the multiple servers, the sharing range is expanded.

In the above technical solution, preferably, the data transmission method can further include defining a service sharing identifier for the D2D service, such that the service can be identified according to the service sharing identifier.

In the technical solution, by defining an identifier for the sharing service, the server can directly identify the sharing service according to the identifier and take corresponding solutions, such that determination of whether or not the service is the sharing service can be avoided, which saves power consumption of user equipment and also reduces operating cost of operators.

In the above technical solution, preferably, the service network topology structure information includes one of the following or a combination of the following: node position information, node attribute information, and node identifier information of the topology structure.

In the technical solution, the service network topology structure information formed by any one of or a combination of different node position information, node attribute information, and node identifier information has its uniqueness. The corresponding particular hosted network is determined according to the service network topology structure information, which contributes to the increase of security of data sharing. Wherein, the node position information, such as eNB id, GPS coordinates of the node, indicates the information of the region of the node. The node attribute indicates that the node belongs to a data reception node or/and a data source node. The node identifier indicates the identity of user equipment, such as IMSI, and so on.

In the above technical solution, preferably, the data transmission method further includes establishing the determined hosted network directly and transmitting a networking notification to the destination terminal.

In the technical solution, the corresponding hosted network is determined according to the obtained service network topology structure information, and the destination terminal is informed to cause the destination terminal to know the condition of the current access network, which enhances security of network sharing, and solves the trust and incentive problem in the D2D network.

In the above technical solution, preferably, the data transmission method can further include transmitting a networking recommendation to the destination terminal after the hosted network corresponding to the service is determined, such that whether or not the hosted network is established is determined according to the networking feedback information of the destination terminal.

In the technical solution, after the hosted network is determined, the networking recommendation is transmitted to ask for permission of the destination terminal. The hosted network is established under the condition of that the destination terminal agrees, which greatly enhances security of the destination terminal.

In the above technical solution, preferably, the data transmission method further includes: acquiring a preset physical domain networking rule and a business mode domain networking rule, and determining the hosted network corresponding to the service according to the preset physical domain networking rule, the business mode domain networking rule, and the service network topology structure information.

Figure 4B:
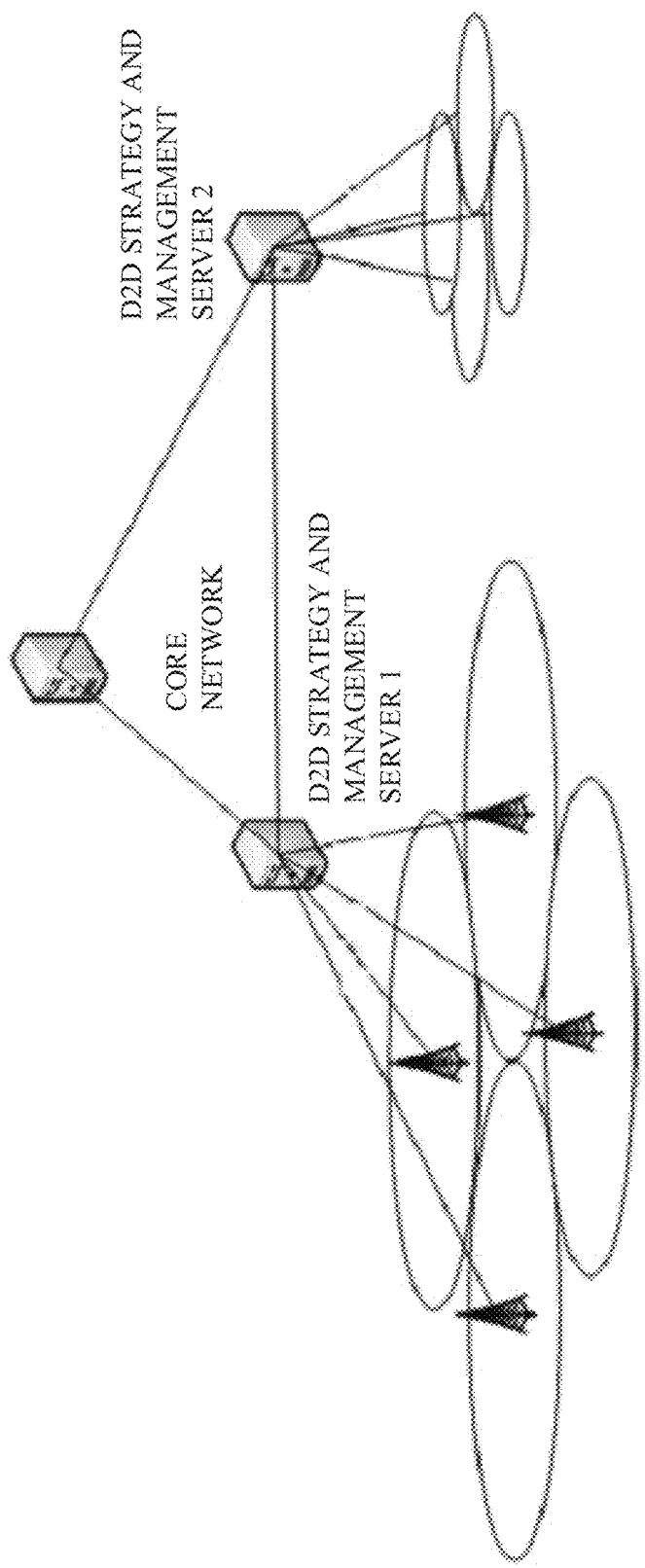
FIG. 4b shows a network structure diagram of a data transmission method in accordance with an exemplary implementation of the present disclosure.

FIG. 4*b* shows a network structure diagram of a server in accordance with an exemplary implementation of the present disclosure.

As shown in FIG. 4*b*, to realize D2D network (D2D LAN) data management and strategy control function, the server of the present disclosure can be referred as a "D2D strategy and management server".

The D2D strategy and management server can be a physical entity or a logical entity, and can also be enhancement of an independent entity or an existed entity (access network or core network node), and can also be a combination of one or more entities.

If the D2D strategy and management server is independent of the base station, a signaling interface needs to be established between the D2D strategy and management server and the base station.

There is a signaling interaction interface between the D2D strategy and management servers.

There is a signaling interaction interface between the D2D strategy and management server and the core network (for example, HSS/HLR).

The functions of the D2D strategy and management server includes:

(1) managing and assigning a service identifier of a service within a district:

Defining a D2D service identifier for a certain D2D data sharing service for identifying different services of the hosted network; inquiring the service requested by a user equipment to find the corresponding D2D service identifier; and managing, maintaining, and issuing a data sharing request.

(2) service domain network networking management:

The present disclosure divides the networking of the service domain network into four modes according to different service requester-sides and different types of service requests. The following will specifically illustrate the modes.

1. Under an "issue-search" mode, the server is used to maintain a "data sharing request" issued by an UE, define a D2D service identifier for it, and transmit a "service sharing notification" (including the D2D service identifier and the service description information) to cells within the district, and search a potential interest user equipment (UE). The server can also transmit the "data sharing request" to other servers to search a potential interest UE outside of the region.

2. Under a "request-recommendation" mode, the server searches in the database according to the service request transmitted by the UE to determine whether or not a D2D sharing network having the same service exists at current time and inquire the user equipment whether or not the D2D sharing network can be established to receive data.

3. Under a "broadcast-interest" mode, a service identifier is defined, and the identifier and service description information are transmitted to cells within/out of the district to search a potential interest UE.

4. Under an "interest group" mode, the database of interest groups within the district is updated and maintained, and interacts with servers of other districts to form a wide area group. The business mode domain data management (the function can be separated and arranged at the base station side) is in charge of interaction with the core network, and maintains and updates a UE credit level black and white list within the district (including relay selection and networking optimization algorithm).

Figure 5A:
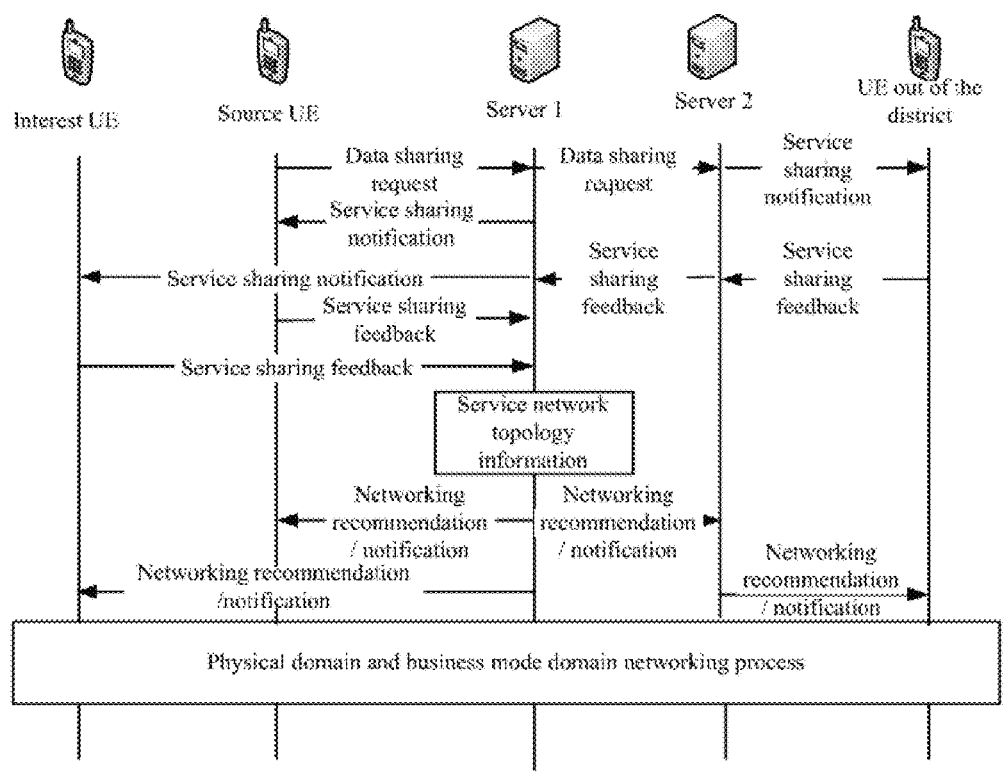
FIG. 5a shows a schematic diagram of an "issue-search" mode of the server in accordance with an exemplary implementation of the present disclosure.
Figure 5B:
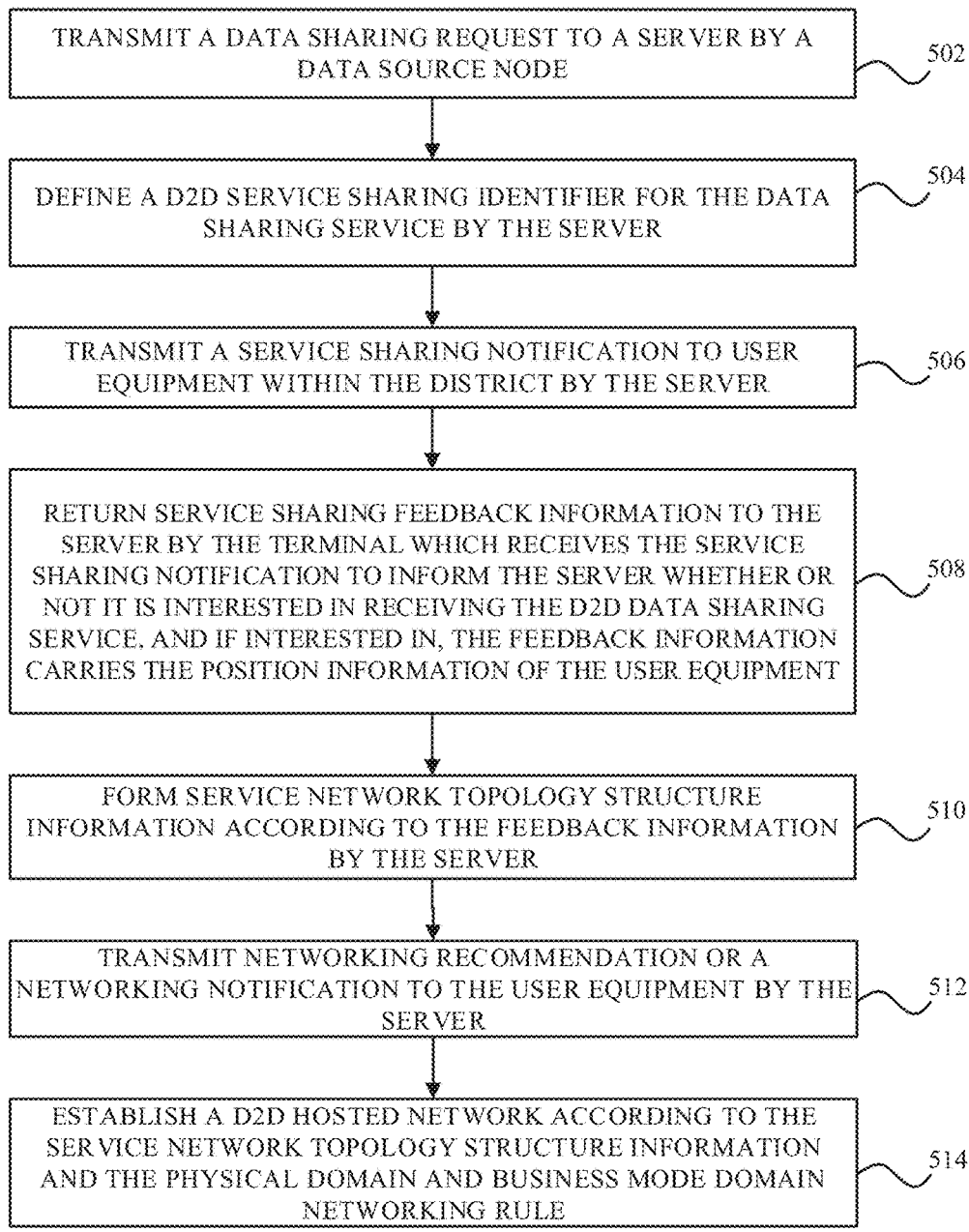
FIG. 5b shows a flow chart under the "issue-search" mode of the server in accordance with an exemplary implementation of the present disclosure.

FIG. 5a and FIG. 5b respectively show a schematic view and a flow chart of the "issue-search" mode of the server in accordance with an exemplary implementation of the present disclosure.

As shown in FIG. 5a and FIG. 5b, under the scenario of that the terminal hopes to issue a sharing data service through the mobile network, the "issue-search" mode of the server of the implementations of the present disclosure includes the following operations.

In operation 502, transmitting, by a data source node, a data sharing request to the server. The data sharing request includes service description information which is used to describe data content to be shared, and access limitation information which is used to describe a time range of opening the data sharing service (for example, N hours) and/or condition information of access limitation. For example, credit level>N or particular groups/users are allowed to be accessed.

In operation 504, defining, by the server, a D2D service sharing identifier for the data sharing service for identifying the D2D sharing service, and storing and maintaining, by the server, the service description information and the access limitation information included in the data sharing request.

In operation 506, transmitting, by the server, a service sharing notification to user equipment within the district, such that a potential destination terminal can be searched after the service sharing notification is transmitted by the base station. Wherein, the server can transmit the service sharing request to other servers, and issue the service sharing notification within the districts of other servers. The server can transmit service sharing broadcast periodically or once, and the broadcast signaling includes the service description information and the access limitation information.

In operation 508, returning, by the terminal which receives the service sharing notification, service sharing feedback information to the server to inform the server whether or not it is interested in receiving the D2D data sharing service. If the terminal is interested in receiving the D2D sharing service, the feedback information carries the position information of the user equipment.

In operation 510, forming, by the server, service network topology structure information according to the feedback information. The information is used to describe the topology structure of the service network. The information may include the node position information, such as eNB id, GPS coordinates of the node, which indicates the information of the region of the node, the node attribute which indicates that the node belongs to a data reception node or/and a data source node, and the node identifier which indicates the identity of the user equipment, such as IMSI, and so on.

In operation 512, transmitting, by the server, networking recommendation or a networking notification to the user equipment. The server can directly inform the user equipment to establish the D2D network according to the service network topology structure information, and can also transmit recommendation signaling and determine whether or not to establish the D2D network according to the feedback of the user equipment.

In operation 514, establishing a D2D hosted network according to the service network topology structure information and the physical domain and business mode domain networking rule.

Figure 6A:
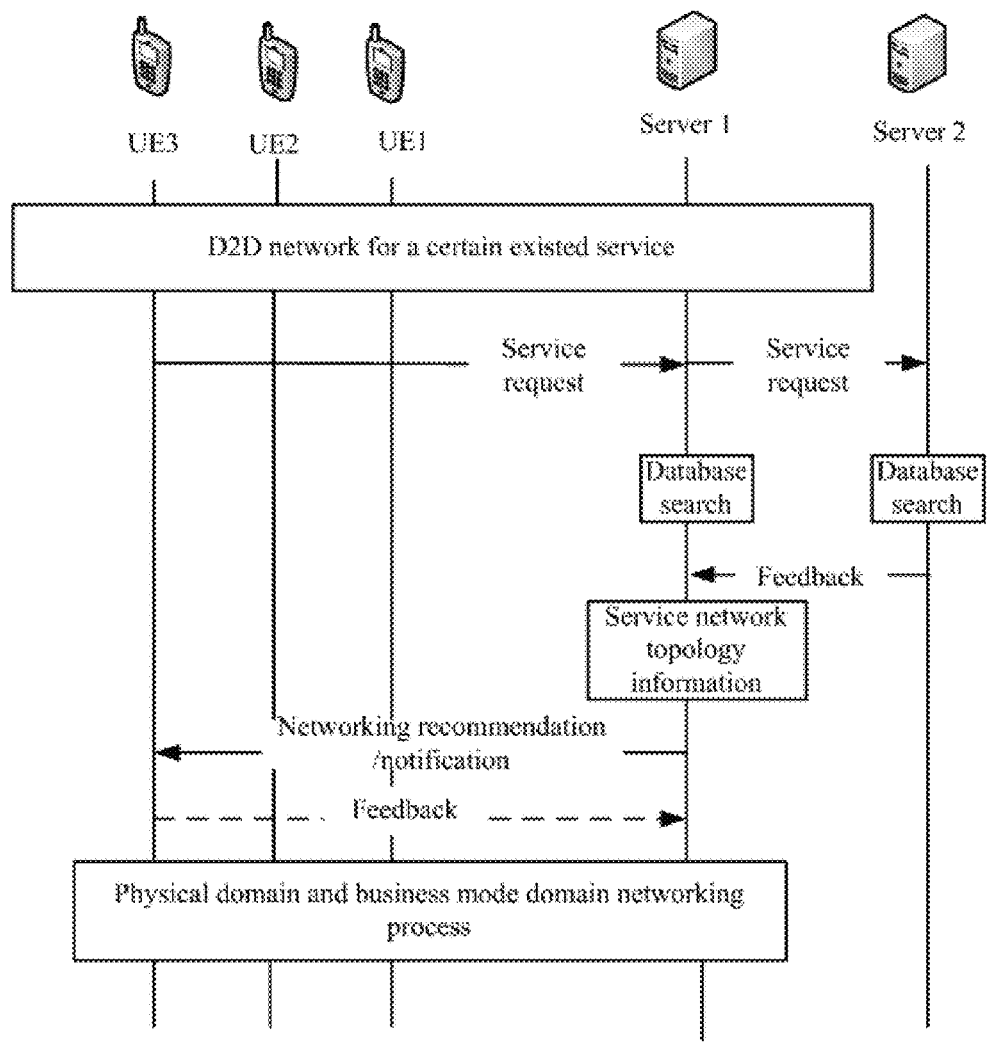
FIG. 6a shows a schematic diagram of a "request-recommendation" mode of the server in accordance with an exemplary implementation of the present disclosure.
Figure 6B:
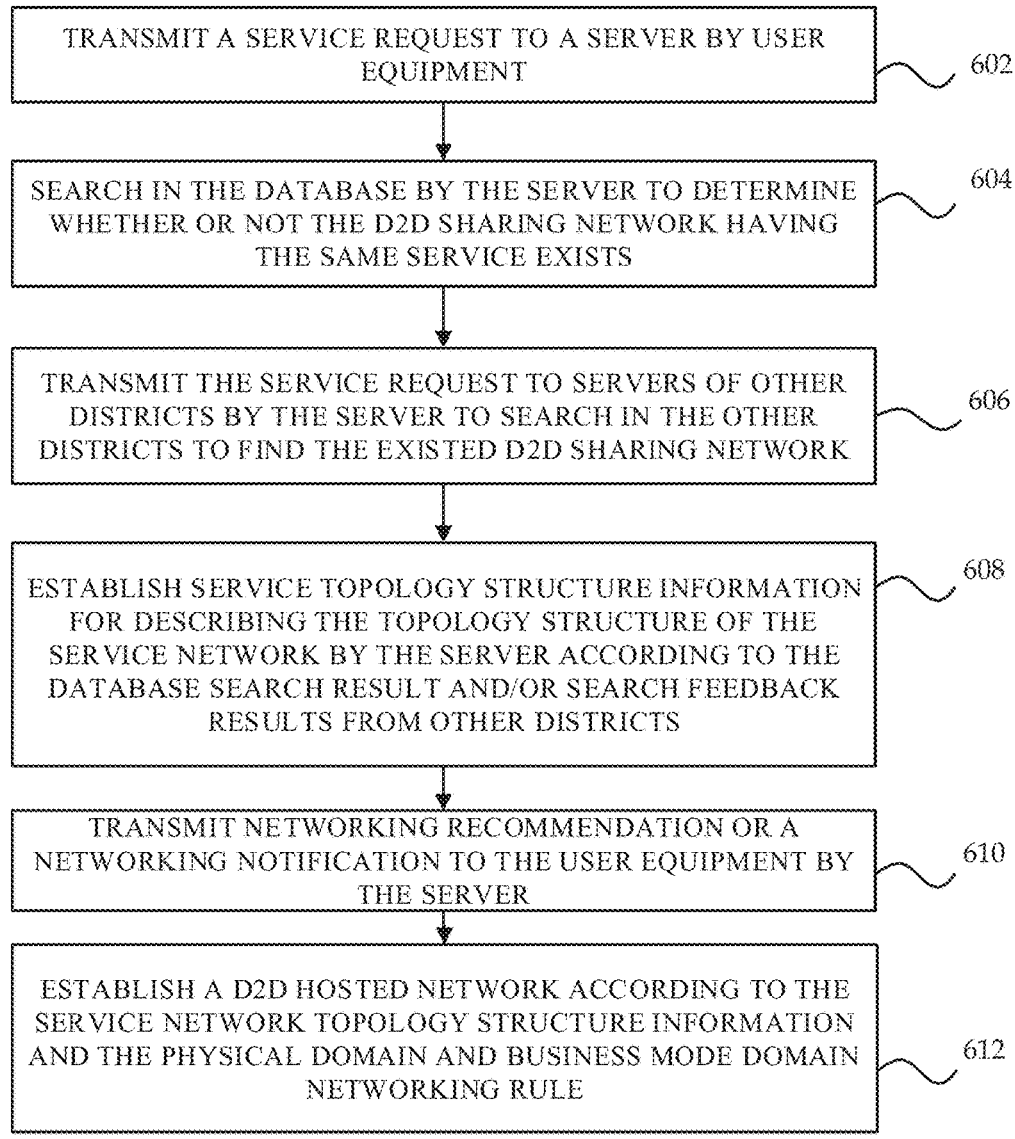
FIG. 6b shows a flow chart under the "request-recommendation" mode of the server in accordance with an exemplary implementation of the present disclosure.

FIG. 6a and FIG. 6b respectively show a schematic view and a flow chart of the "request-recommendation" mode of the server in accordance with an exemplary implementation of the present disclosure.

As shown in FIG. 6a and FIG. 6b, under the scenario of that the server determines whether or not to establish the D2D sharing network according to whether or not other clients which have the similar request exists when the user equipment requests the data service, the "request-recommendation" mode of the server of the implementations of the present disclosure includes the following operations.

In operation 602, transmitting, by user equipment, a service request to the server. The service request includes position information of the user equipment.

In operation 604, searching, by the server, in the database to determine whether or not the D2D sharing network having the same service exists. The database of the server can interact with the core network to establish a corresponding relationship between the public service and the D2D sharing service. According to the corresponding relationship, the server can determine whether or not a D2D sharing network corresponding to the service launched by the user equipment exists.

In operation 606, transmitting, by the server, the service request to servers of other districts to search in the other districts to find the existed D2D sharing network.

In operation 608, establishing, by the server, the service topology structure information for describing the topology structure of the service network according to the database search result and/or search feedback results from other districts. The information may include the following information: the node position information, such as eNB id, GPS coordinates of the node, which indicates the information of the region of the node, the node attribute which indicates that the node belongs to a data reception node or/and a data source node, and the node identifier which indicates the identity of the user equipment, such as IMSI, and so on.

In operation 610, transmitting, by the server, networking recommendation or a networking notification to the user equipment. The service can directly inform the user equipment to establish the D2D network according to the service network topology structure information, and can also transmit recommendation signaling and determine whether or not to establish the D2D network according to the feedback of the user equipment In operation 612, establishing a D2D hosted network according to the service network topology structure information and the physical domain and business mode domain networking rule.

Figure 7A:
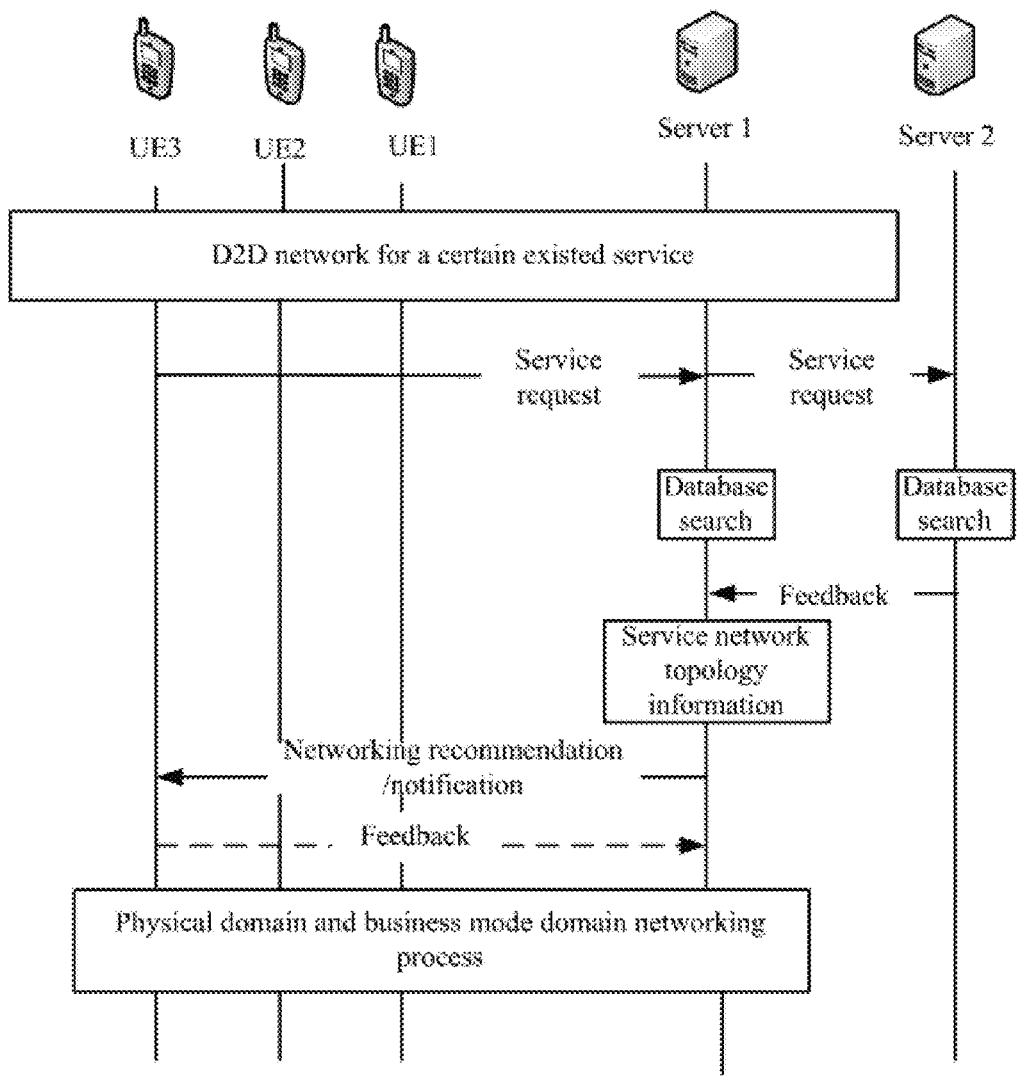
FIG. 7a shows a schematic diagram of a "broadcast-interest" mode of the server in accordance with an exemplary implementation of the present disclosure.
Figure 7B:
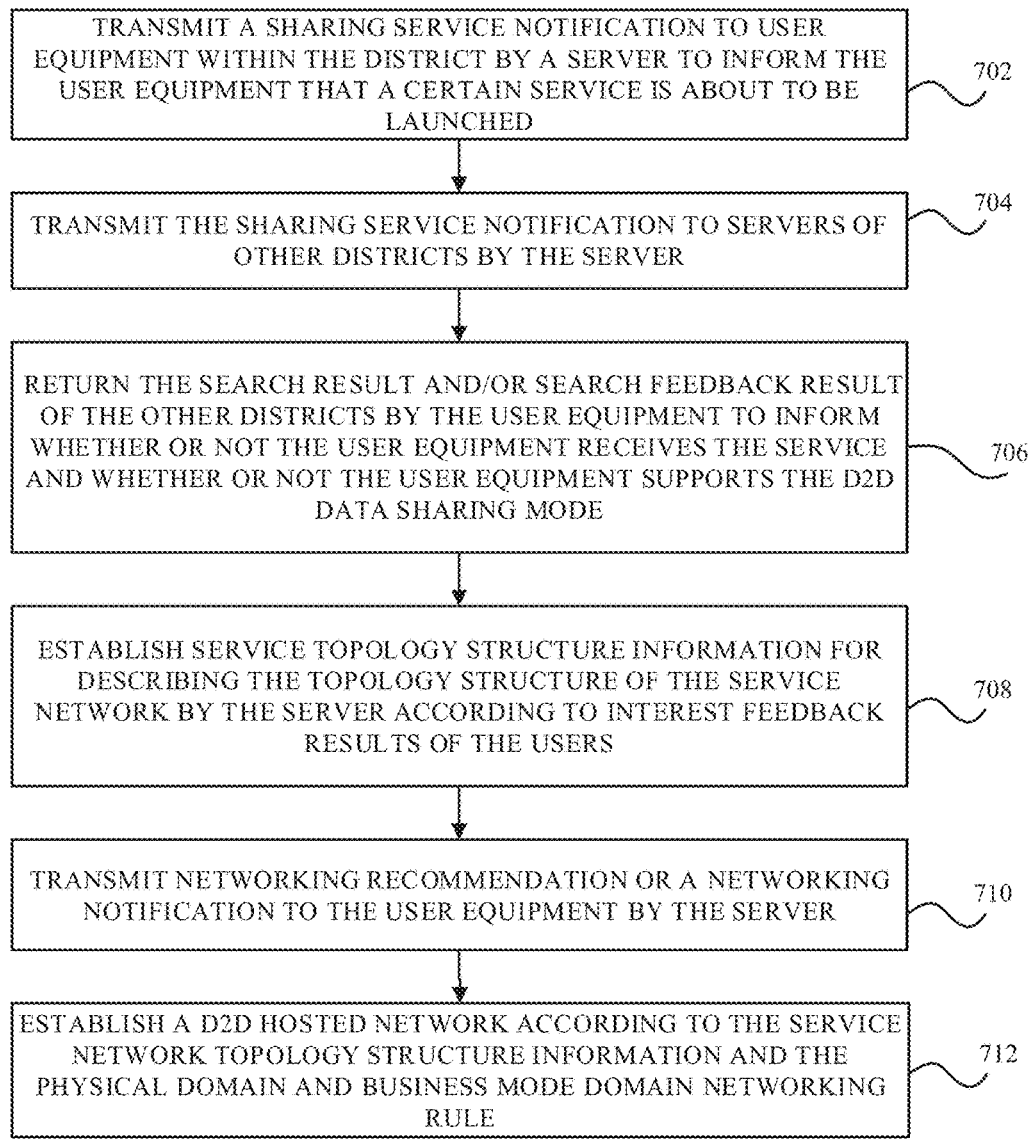
FIG. 7b shows a flow chart under the "broadcast-interest" mode of the server in accordance with an exemplary implementation of the present disclosure.

FIG. 7a and FIG. 7b respectively show a schematic view and a flow chart of the "broadcast-interest" mode of the server in accordance with an exemplary implementation of the present disclosure.

As shown in FIG. 7a and FIG. 7b, under the scenario of that the network determines whether or not to establish the D2D sharing network according to whether or not interest users exist when the network-side issues a data service, the "broadcast-interest" mode of the server of the implementations of the present disclosure includes the following operations.

In operation 702, transmitting, by the server, a sharing service notification to user equipment within the district to inform the user equipment that a certain service is about to be launched. The message includes a service description message used for describing data content to be shared and also includes a D2D service identifier.

In operation 704, transmitting, by the server, the sharing service notification to servers of other districts to search in the other districts to find a potential interest user.

In operation 706, returning, by the user equipment, the search result and/or search feedback result of the other districts to inform whether or not the user equipment receives the service and whether or not the user equipment supports the D2D data sharing mode. The message may include the information of the position and ability of the user equipment.

In operation 708, establishing, by the server, the service topology structure information for describing the topology structure of the service network according to interest feedback results of the users. The information may include the following information: the node position information, such as eNB id, GPS coordinates of the node, which indicates the information of the region of the node, the node attribute which indicates that the node belongs to a data reception node or/and a data source node, and the node identifier which indicates the identity of user equipment, such as IMSI, and so on.

In operation 710, transmitting, by the server, networking recommendation or a networking notification to the user equipment. The server can directly inform the user equipment to establish the D2D network according to the service network topology structure information, and can also transmit recommendation signaling and determine whether or not to establish the D2D network according to the feedback of the user equipment.

In operation 712, establishing a D2D hosted network according to the service network topology structure information and the physical domain and business mode domain networking rule.

Figure 8A:
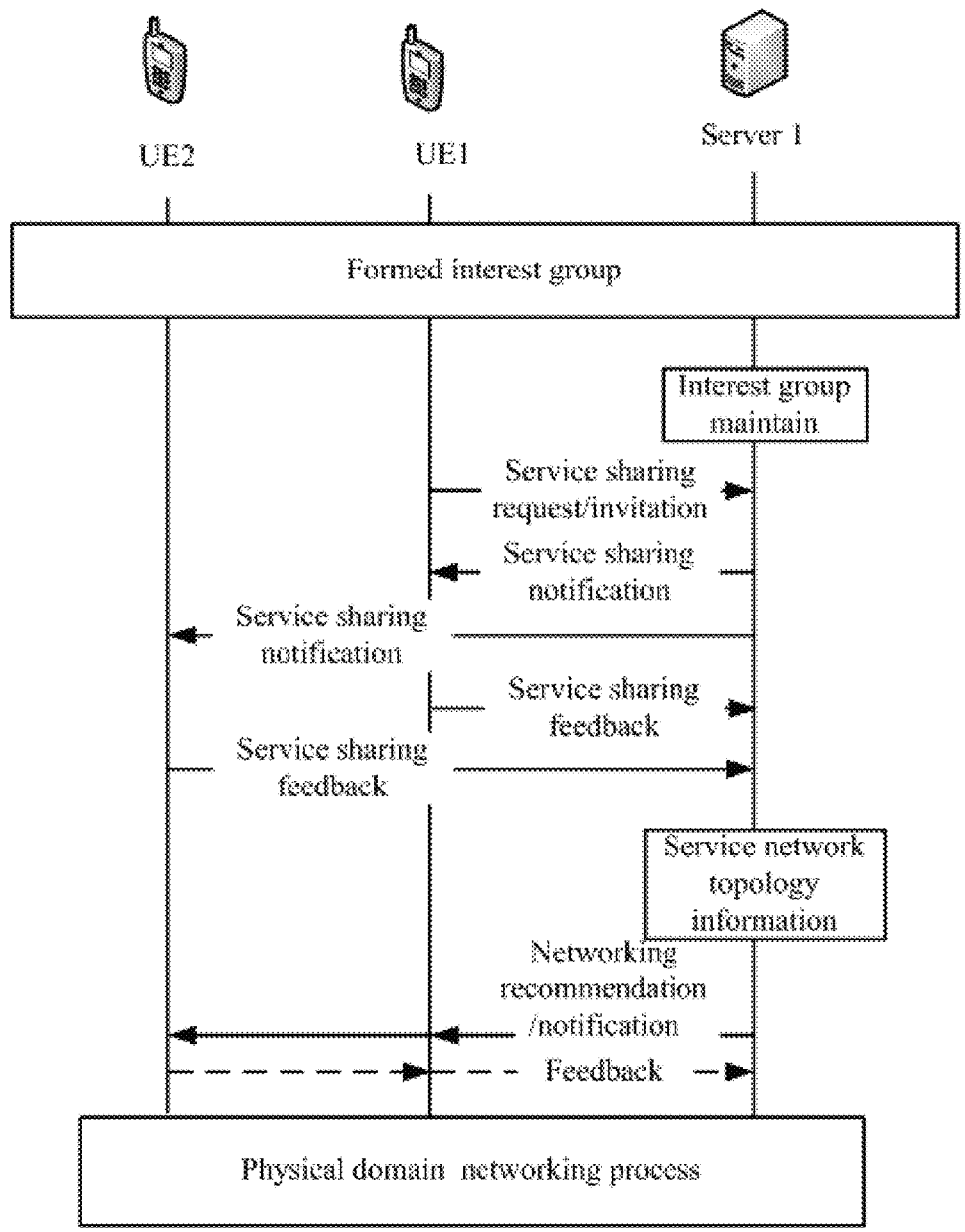
FIG. 8a shows a schematic diagram of an "interest group" mode of the server in accordance with an exemplary implementation of the present disclosure.
Figure 8B:
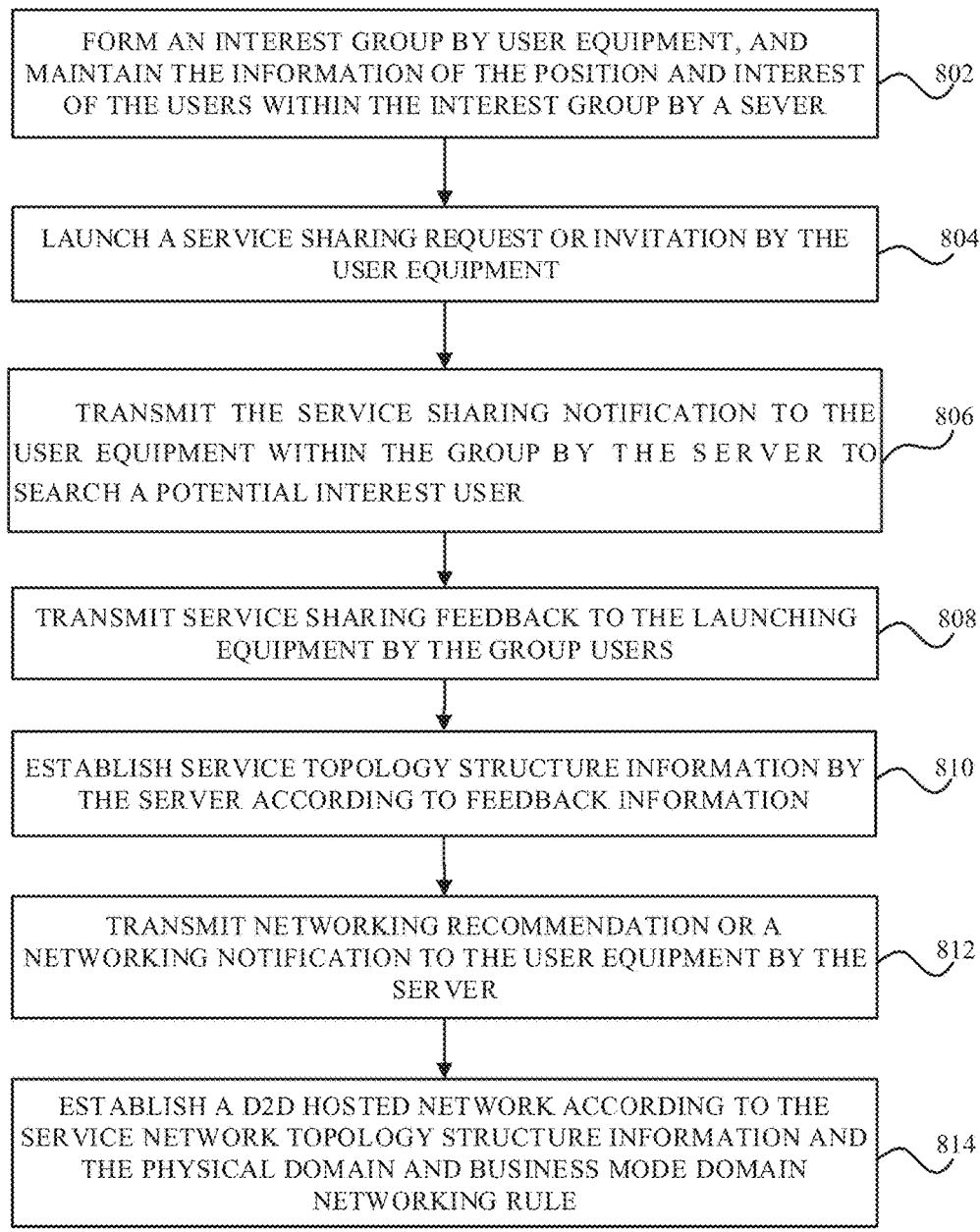
FIG. 8b shows a flow chart under the "interest group" mode of the server in accordance with an exemplary implementation of the present disclosure.

FIG. 8a and FIG. 8b respectively show a schematic view and a flow chart of an interest group of the server in accordance with an exemplary implementation of the present disclosure.

As shown in FIG. 8a and FIG. 8b, the server of the implementations of the present disclosure under the "interest group" mode includes the following operations.

In operation 802, forming an interest group by user equipment, and maintaining the information of the position and interest of the users within the interest group by the server. Wherein the interest information is used for indicating which kind of services the user equipment is interested in or the user equipment is interested in service from which user equipment.

In operation 804, launching, by the user equipment, a service sharing request or invitation. Wherein the service sharing request is used for indicating that the user hopes to share a certain data service within the group. The service sharing invitation is used for indicating that the user equipment hopes to launch a certain external service and invites the group users to take part in.

In operation 806, transmitting, by the server, the service sharing notification to the user equipment within the group to search a potential interest user.

In operation 808, transmitting, by the group users, service sharing feedback to the launching equipment.

In operation 810, establishing, by the server, the service topology structure information for describing the topology structure of the service network according to service sharing feedback information. The information may include the following information: the node position information, such as eNB id, GPS coordinates of the node, which indicates the information of the region of the node, the node attribute which indicates that the node belongs to a data reception node or/and a data source node, and the node identifier which indicates the identity of a user equipment, such as IMSI, and so on.

In operation 812, transmitting, by the server, networking recommendation or a networking notification to the user equipment. The server can directly inform the user equipment to establish the D2D network according to the service network topology structure information, and can also transmit recommendation signaling and determine whether or not to establish the D2D network according to the feedback of the user equipment In operation 814, establishing a D2D hosted network according to the service network topology structure information and the physical domain and business mode domain networking rule.

Figure 9:
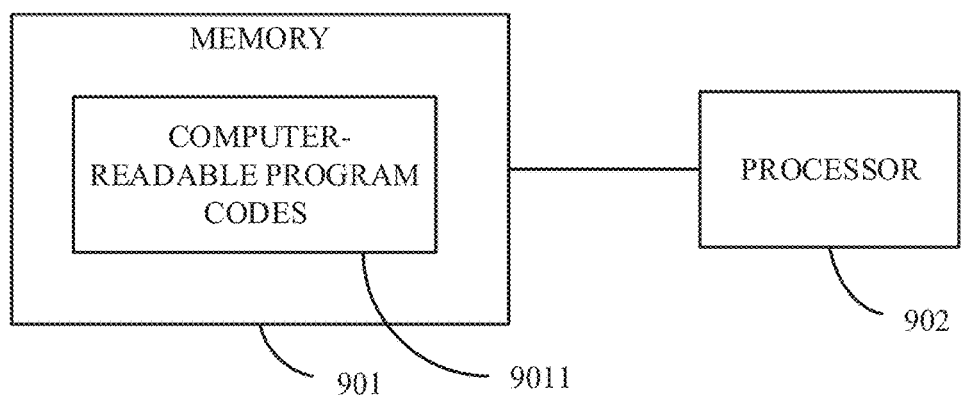
FIG. 9 is a schematic structural diagram of a server in accordance with an implementation of the present disclosure.

FIG. 9 is a schematic structural diagram of a server in accordance with an implementation of the present disclosure.

As shown in FIG. 9, the server can include but not limited to a memory 901 and a processor 902. The memory 901 is electrically coupled to the processor 902.

The memory 901 stores a plurality of computer-readable program codes 9011. The memory 901 can be a read only memory (ROM), a random access memory (RAM), a U-disk, a removable hard disk, etc.

The processor 902 can include multiple cores for multi-thread or parallel processing. The processor 902 is configured to execute the plurality of computer-readable program codes 9011 to execute the In this implementation, the processor 902 is configured to execute the plurality of computer-readable program codes 9011 to execute any of the data transmission methods described above which will not be repeated herein.

The above specifically illustrates the technical solution of the present disclosure in combination with the accompanying drawings. By means of the technical solutions of the present disclosure, the trust and incentive problem in D2D network can be solved, security in data sharing can be increased, and cross-layer optimization between the physical domain network and the service domain network can be accomplished.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A server, comprising:
a memory storing computer-readable program codes; and
a processor configured to execute the computer-readable program codes to:
based on a determination that a service request sent by a terminal is received or that it is detected that a network-side needs to share a service, determine a destination terminal to share the service;
generate service network topology structure information corresponding to the service based on the destination terminal;
determine a hosted network corresponding to the service based on the service network topology structure information; and
transmit a networking recommendation to the destination terminal after the hosted network corresponding to the service is determined, and determine whether the hosted network is established according to networking feedback information of the destination terminal.

2. The server of claim 1, wherein the service request comprises a service sharing request and a normal service request.

3. The server of claim 2, wherein the computer-readable program codes further comprise program codes to:
when the service request is received from the terminal and the service request is the normal service request, search in databases according to the normal service request to determine at least one of: whether a device to device (D2D) sharing network corresponding to the service exists, whether other users launch the same service request, and whether the other users have same service requirement; and
determine the destination terminal according to search results.

4. The server of claim 3, wherein the databases comprise a database of the server and databases of other servers, and the computer-readable program codes further comprise program codes to:
transmit the normal service request to the other servers, wherein the other servers search in corresponding databases to determine at least one of: whether the D2D sharing network corresponding to the service exists, whether the other users launch the same service request, and whether the other users have the same service requirement; and
receive the search results from the other servers.

5. The server of claim 2, wherein the computer-readable program codes further comprise program codes to:
when the service request sent by the terminal is received and the service request is the service sharing request, determine multiple group terminals, wherein a first interest group of the multiple group terminals is the same as a second interest group of the terminal, and transmit a service sharing notification to the multiple group terminals; and
determine the destination terminal according to service sharing feedback information transmitted by the multiple group terminals.

6. The server of claim 2, wherein the computer-readable program codes comprise further program codes to:
transmit a service sharing notification to multiple terminals when the service request from the terminal is received and the service request is the service sharing request, wherein the service sharing request comprises service description information and access limitation information; and
determine the destination terminal according to service sharing feedback information transmitted by the multiple terminals, wherein the service sharing feedback information comprises position information of the terminal.

7. The server of claim 6, wherein the multiple terminals are associated with the server and other servers, and the computer-readable program codes comprise further program codes to:
transmit the service sharing notification to the other servers, wherein the other servers transmit the service sharing notification to corresponding terminals; and
receive the service sharing feedback information transmitted by the corresponding terminals of the other servers.

8. The server of claim 2, wherein the computer-readable program codes further comprise program codes to:
transmit a service sharing notification to multiple terminals when it is detected that the network-side has service requirement, wherein the service sharing notification comprises service description information and service identifier information; and
determine the destination terminal according to service sharing feedback information transmitted by the multiple terminals, wherein, the service sharing feedback information comprises position information and capability information of the terminal.

9. The server of claim 1, wherein the computer-readable program codes further comprise program codes to:
acquire a preset physical domain networking rule and a business mode domain networking rule; and
determine the hosted network corresponding to the service according to the preset physical domain networking rule, the business mode domain networking rule, and the service network topology structure information.

10. A method for data transmission, comprising:
based on one of a determination that a service request sent by a terminal is received by a server and a determination that it is detected that a network-side needs to share the service, determining a destination terminal to share a service;
generating service network topology structure information corresponding to the service according to the destination terminal;
determining a hosted network corresponding to the service according to the service network topology structure information;
transmitting a networking recommendation to the destination terminal after the hosted network corresponding to the service is determined, and determining whether the hosted network is established according to networking feedback information of the destination terminal.

11. The method of claim 10, wherein the service request comprises a service sharing request and a normal service request.

12. The method of claim 11, wherein determining a destination terminal to share a service comprises:
when the service request is received from the terminal and the service request is the normal service request searching, by the server according to the normal service request, in databases to determine one of whether a device to device (D2D) sharing network corresponding to the service exists, whether other users launch the same service request, and whether the other users have same service requirement; and
determining the destination terminal according to search results.

13. The method of claim 12, wherein the databases comprise a database of the server and databases of other servers, and the method further comprises:
transmitting the normal service request to the other servers, wherein the other servers search in corresponding databases to determine one of whether the D2D sharing network corresponding to the service exists, whether the other users launch the same service request, and whether the other users have the same service requirement; and
receiving the search results from the other servers.

14. The method of claim 11, wherein determining a destination terminal to share a service comprises:
when the service request sent by the terminal is received and the service request is the service sharing request, determining multiple group terminals, wherein a first interest group of the multiple group terminals is the same as a second interest group of the terminal, and transmitting a service sharing notification to the multiple group terminals; and
determining the destination terminal according to service sharing feedback information transmitted by the multiple group terminals.

15. The method of claim 11, wherein determining a destination terminal to share a service comprises:
transmitting a service sharing notification to multiple terminals when the service request from the terminal is received and the service request is the service sharing request, wherein the service sharing request comprises service description information and access limitation information; and
determining the destination terminal according to service sharing feedback information transmitted by the multiple terminals, wherein the service sharing feedback information comprises position information of the terminal.

16. The method of claim 15, wherein the multiple terminals are associated with the server and other servers, and the method further comprises:
transmitting the service sharing notification to the other servers, wherein the other servers transmit the service sharing notification to corresponding terminals; and
receiving the service sharing feedback information transmitted by the corresponding terminals of the other servers.

17. The method of claim 11, wherein determining a destination terminal to share a service comprises:
transmitting a service sharing notification to multiple terminals when it is detected that the network-side has service requirement, wherein the service sharing notification comprises service description information and service identifier information; and
determining the destination terminal according to service sharing feedback information transmitted by the multiple terminals, wherein, the service sharing feedback information comprises position information and capability information of the terminal.

18. The method of claim 10, further comprising:
acquiring a preset physical domain networking rule and a business mode domain networking rule; and
determining the hosted network corresponding to the service according to the preset physical domain networking rule, the business mode domain networking rule, and the service network topology structure information.

* * * * *